United States Patent
Hardwick et al.

(10) Patent No.: US 10,116,723 B2
(45) Date of Patent: Oct. 30, 2018

(54) CAMPUS CONTENT DISTRIBUTION SYSTEMS AND METHODS

(71) Applicant: The DIRECTV Group, Inc., El Segundo, CA (US)

(72) Inventors: Dennis M. Hardwick, Huntington Beach, CA (US); Sassan Pejhan, Los Angeles, CA (US); Johnny Shum, Manhattan Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 207 days.

(21) Appl. No.: 14/992,624

(22) Filed: Jan. 11, 2016

(65) Prior Publication Data
US 2017/0201564 A1    Jul. 13, 2017

(51) Int. Cl.
*G06F 15/16* (2006.01)
*H04L 29/06* (2006.01)
*H04L 29/08* (2006.01)
*H04L 29/12* (2006.01)

(52) U.S. Cl.
CPC ........ *H04L 65/607* (2013.01); *H04L 61/2007* (2013.01); *H04L 65/4076* (2013.01); *H04L 67/02* (2013.01)

(58) Field of Classification Search
CPC ............. H04L 61/2007; H04L 65/4076; H04L 65/607; H04L 67/02
USPC .................................................. 709/230, 231
See application file for complete search history.

(56) References Cited

U.S. PATENT DOCUMENTS

| | | | | |
|---|---|---|---|---|
| 6,963,590 | B1 * | 11/2005 | Mann ................... | H04L 12/2801 348/385.1 |
| 8,856,843 | B1 * | 10/2014 | Hubach ................ | G06F 13/00 725/136 |
| 9,680,601 | B2 * | 6/2017 | Hong .................... | H04L 1/0041 |
| 2011/0197246 | A1 * | 8/2011 | Stancato .............. | H04L 65/605 725/111 |
| 2012/0304238 | A1 * | 11/2012 | Rivera ................. | H04N 21/643 725/110 |
| 2014/0282784 | A1 * | 9/2014 | Pfeffer ............. | H04N 21/64322 725/112 |

* cited by examiner

*Primary Examiner* — Phuoc H Nguyen
(74) *Attorney, Agent, or Firm* — Harness, Dickey & Pierce, P.L.C.

(57) ABSTRACT

A predetermined set of channels from a satellite broadcast are received and tuned in parallel at a head end module of a local area network, which potentially serves a large number of users with electronic devices via multiple wired and/or wireless access points, such as at a college campus or a business center. Each channel of content is transcoded into multiple content streams providing multiple bit-rate options for each channel of content, e.g., using HTTP Adaptive Streaming protocols and/or Scalable Video Coding. The transcoded content streams are packetized and transmitted with respective multicast IP addresses to the access points on the local area network. Electronic devices connected to an access point are able to stream content from any one of the predetermined set of channels by joining one or more corresponding multicasts.

20 Claims, 7 Drawing Sheets

CAMPUS CONTENT DISTRIBUTION SYSTEMS AND METHODS

TECHNICAL FIELD

The present disclosure relates to content distribution systems and methods and more particularly to content distribution systems and methods on campuses and other locations where a large number of users may concurrently stream content.

BACKGROUND

The statements in this section merely provide background information related to the present disclosure and may not constitute prior art.

Recent years have witnessed significant developments in the manner in which consumers watch TV. Broadband residential Internet connections provide support for limited implementations of Internet Protocol TV (IPTV). The advent of smart phones and tablet computers with high resolution screens and both WiFi and cellular connections provides an opportunity for consumers to watch content almost anywhere and anytime. Adaptive bit-rate streaming technologies have been developed to help consumers deal with varying network conditions with fewer interruptions to their viewing experience.

Dozens of companies, including established broadcasters and distributors, new start-ups and even content producers, have tried to exploit these trends by providing various kinds of IP-based TV services to all kinds of end user devices (Set-top boxes, PCs, smartphones, tablets and game consoles). These services may include, for example, downloading of content and/or streaming of live channel content and Video on Demand (watching pre-recorded movies or TV programs).

However, the performance of these IP-based services diminishes for residential customers where more than a few devices at a time are streaming or downloading content. Providing these services to a campus environment, such as a University with thousands of students, faculty members and administrative staff is an even bigger challenge. With potentially thousands of simultaneous users (e.g. during prime time, or during an important sports event), the campus network could become clogged. While universities typically have high bandwidth connections to the Internet, those connections still would not be able to accommodate hundreds (let alone thousands) of simultaneous, high-quality video streams.

Broadcasters and distributors provide some television services to multi-dwelling environments such as hotels, but the customers at those premises are not able to access the content on their own devices and using wireless connections. So the campus environment, where potentially thousands of users would simultaneously access high quality video on any personal device, presents a new challenge which has not yet been adequately met.

SUMMARY

A predetermined set of channels from a satellite broadcast are received and tuned in parallel at a head end module of a local area network, which potentially serves a large number of users with electronic devices via multiple wired and/or wireless access points, such as at a college campus or a business center. Each channel of content is transcoded into multiple content streams providing multiple bit-rate options for each channel of content, e.g., using HTTP Adaptive Streaming protocols and/or Scalable Video Coding. The transcoded content streams are packetized and transmitted with respective multicast IP addresses to the access points on the local area network. Electronic devices connected to an access point are able to stream content from any one of the predetermined set of channels by joining one or more corresponding multicasts.

In an aspect, a method of streaming content to electronic devices is described. The method includes: receiving, using one or more antennas, radio frequency (RF) signals including content broadcast via satellite; and using a plurality of tuner modules, tuning to predetermined channels of the RF signals to produce a plurality of tuned signals from the RF signals, each of the tuned signals corresponding to content of one of the predetermined channels. The method also includes: demodulating the tuned signals to form demodulated signals, respectively; decoding the demodulated signals to form decoded signals, respectively; and encoding the decoded signals to produce sets of transcoded signals for the predetermined channels, respectively, each of the sets of transcoded signals including (i) at least one signal having a first bit rate that is less than a second bit rate of the one of the tuned signals of the respective one of the predetermined channels and (ii) at least one other signal for displaying the content of the respective one of the channels. The method also includes: using a server, packetizing the transcoded signals according to Internet Protocol (IP) to produce packetized signals, respectively; and transmitting, using the server, a computer network, and a plurality of access points, selected ones of the packetized signals to electronic devices using multicast Internet Protocol.

In further features, each of the sets of transcoded signals includes a plurality of signals having respective bit rates that are each less than the second bit rate of the one of the tuned signals of the respective one of the predetermined channels.

In yet further features, encoding the decoded signals to produce sets of transcoded signals for the predetermined channels, respectively, includes encoding the decoded signals according to a Hyper Text Transfer Protocol (HTTP) Adaptive Streaming communication protocol.

In still further features, encoding the decoded signals to produce sets of transcoded signals for the predetermined channels, respectively, includes encoding the decoded signals according to a Microsoft Smooth Streaming protocol, an Apple HTTP Live Stream (HLS) protocol, or a Moving Picture Experts Group (MPEG) Dynamic Adaptive Streaming over HTTP (DASH) protocol.

In further features, encoding the decoded signals to produce sets of transcoded signals for the predetermined channels, respectively, includes encoding the decoded signals according to a Scalable Video Coding (SVC) protocol.

In yet further features, each of the sets of transcoded signals includes a base layer signal having the first bit rate that is less than the second bit rate of the one of the tuned signals of the respective one of the predetermined channels and at least one enhancement layer signal, and transmitting selected ones of the packetized signals includes transmitting ones of the packetized signals corresponding to the base layer signal and ones of the packetized signals corresponding to the at least one enhancement layer signal using respective multicast IP addresses.

In still further features, the method further includes: receiving at least one of the packetized signals of a predetermined channel at an electronic device via at least one of the plurality of access points; and displaying the content of the predetermined channel on a display of the electronic device based on the at least one of the packetized signals.

In a feature, a head end module for streaming content is described. The head end module includes a plurality of tuner modules receiving, from one or more satellite receiver antennas, radio frequency (RF) signals including content broadcast via satellite, said plurality of tuner modules providing a plurality of tuned signals from predetermined channels of the RF signals, each of the tuned signals corresponding to content of one of the predetermined channels. The head end module also includes: at least one demodulator module receiving the tuned signals and providing demodulated signals, respectively; at least one decoder module receiving the demodulated signals and providing decoded signals, respectively; and at least one encoder module receiving the decoded signals and providing sets of transcoded signals for the predetermined channels, respectively, each of the sets of transcoded signals including (i) at least one signal having a first bit rate that is less than a second bit rate of the one of the tuned signals of the respective one of the predetermined channels and (ii) at least one other signal for displaying the content of the respective one of the predetermined channels. The head end module also includes a server receiving the transcoded signals and transmitting respective packetized signals to one or more access points according to a multicast Internet Protocol (IP).

In further features, each of the sets of transcoded signals includes a plurality of signals having respective bit rates that are each less than the second bit rate of the one of the tuned signals of the respective one of the predetermined channels.

In yet further features, the at least one encoder module encodes the decoded signals according to a Hyper Text Transfer Protocol (HTTP) Adaptive Streaming communication protocol.

In still further features, the at least one encoder module encodes the decoded signals according to a Microsoft Smooth Streaming protocol, an Apple Hyper Text Transfer Protocol (HTTP) Live Stream (HLS) protocol, or a Moving Picture Experts Group (MPEG) Dynamic Adaptive Streaming over HTTP (DASH) protocol.

In further features, the at least one encoder module encodes the decoded signals according to a Scalable Video Coding (SVC) protocol.

In yet further features, each of the sets of transcoded signals includes a base layer signal having the first bit rate that is less than the second bit rate of the one of the tuned signals of the respective one of the predetermined channels and at least one enhancement layer signal, and the server transmits ones of the packetized signals corresponding to the base layer signal and ones of the packetized signals corresponding to the at least one enhancement layer signal using respective multicast IP addresses.

In further features, a system includes: the head end module; at least one of the access points; and an electronic device that receives at least one of the packetized signals of a predetermined channel via the at least one of the access points and that displays the content of the predetermined channel on a display of the electronic device based on the at least one of the packetized signals.

In a feature, a method of streaming content is described. The method includes: receiving, at a content distribution system, content signals corresponding to respective content streams; at the content distribution system, encoding the content signals to produce sets of encoded signals for predetermined channels, respectively, each of the sets of encoded signals including at least (i) one signal having a first bit rate that is less than a second bit rate of the one of the respective content signals and (ii) at least one other signal for displaying the content of the one of the respective content signals; and transmitting, via satellite, the sets of encoded signals to a head end module. The method also includes: using a server at the head end module, multicasting the encoded signals, using respective Internet Protocol (IP) multicast addresses, to a plurality of access points.

In further features, each of the sets of encoded signals includes a plurality of signals having respective bit rates that are each less than the second bit rate of the one of the respective content signals.

In yet further features, encoding the content signals to produce sets of encoded signals for predetermined channels, respectively, includes encoding the content signals according to a Hyper Text Transfer Protocol (HTTP) Adaptive Streaming communication protocol.

In still further features, the content signals to produce sets of encoded signals for predetermined channels, respectively, includes encoding the content signals according to a Microsoft Smooth Streaming protocol, an Apple Hyper Text Transfer Protocol (HTTP) Live Stream (HLS) protocol, or a Moving Picture Experts Group (MPEG) Dynamic Adaptive Streaming over HTTP (DASH) protocol.

In further features, encoding the content signals to produce sets of encoded signals for predetermined channels, respectively, includes encoding the content signals according to a Scalable Video Coding (SVC) protocol.

In yet further features, each of the sets of encoded signals includes a base layer signal having the first bit rate that is less than the second bit rate of the one of the respective content signals and at least one enhancement layer signal, and multicasting the encoded signals includes transmitting ones of the packetized signals corresponding to the base layer signal and ones of the at least one enhancement layer signal using respective multicast IP addresses.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
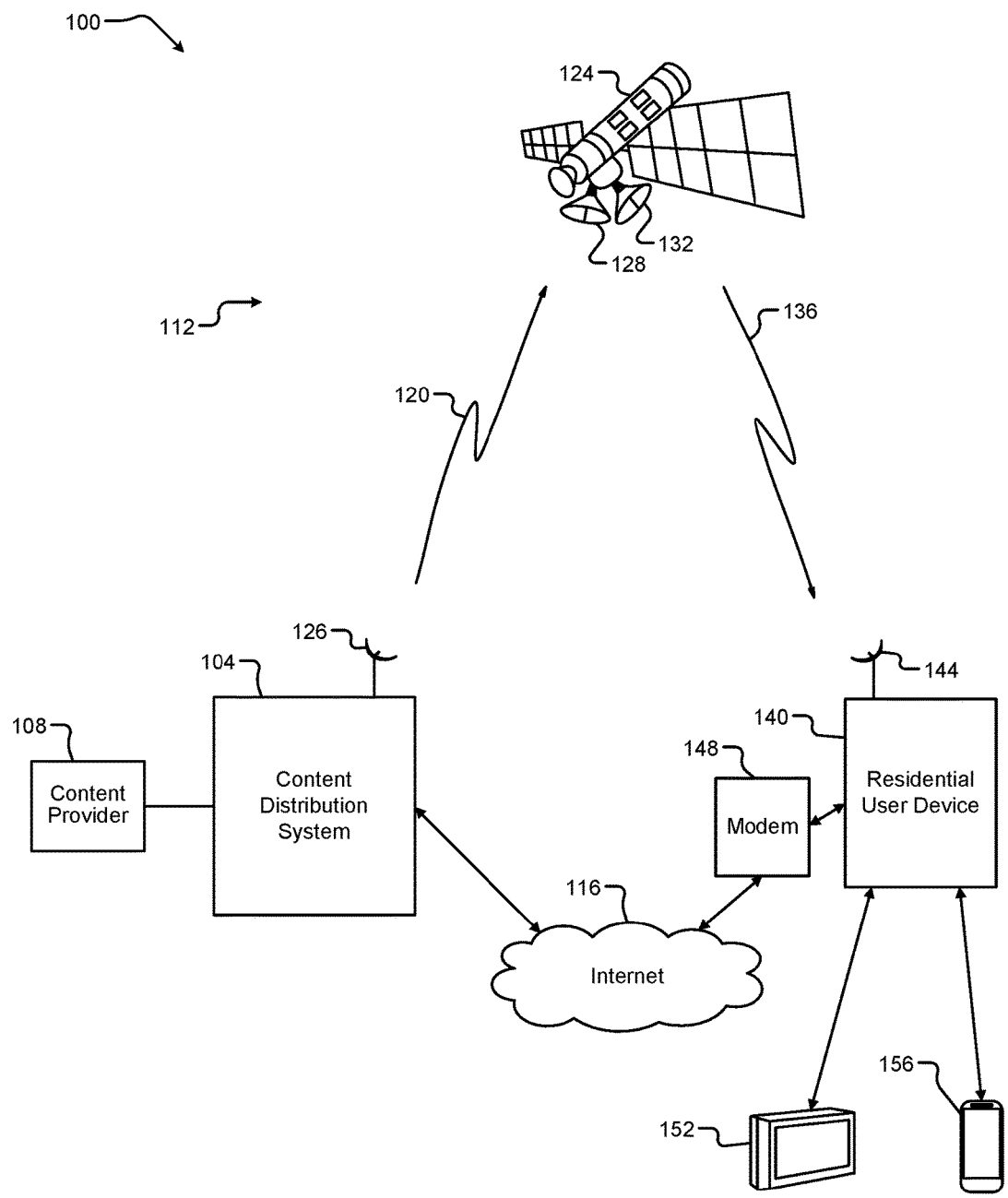
FIGS. 1 and 2 are high level functional block diagrams of an example satellite distribution system in residential and campus settings.

The following description is merely exemplary in nature and is not intended to limit the present disclosure, application, or uses. For purposes of clarity, the same reference numbers will be used in the drawings to identify similar elements.

Television content can be provided via Internet Protocol (IP) based devices in residential settings, where a limited number of wireless devices may stream or download content concurrently. Where a large number of wireless devices may stream and/or download content concurrently, a network serving the content may be overburdened and slowed significantly.

The present disclosure involves streaming content using IP in a setting where a large number of devices may concurrently stream the same content, such as in a campus setting. Content streams are received at a campus via satellite. At the campus, tuning is performed to obtain the content stream of each available channel. Each channel's content stream is encoded into at least one signal having a lower bit rate and resolution than the original signal. For example, each content stream may be encoded using scalable video coding (SVC) to produce one base layer signal having a lower bit rate and resolution than the original signal and one or more enhancement layer signals that can be combined with the base layer signal to better the resolution of the resulting signal. As another example, each content stream may be encoded into multiple signals having different bit rates and resolutions that are less than the original signal for HTTP adaptive streaming. The encoding may be performed at the campus or prior to satellite transmission. The content streams are transmitted to a multitude of electronic devices at the campus using IP transmission. Examples of electronic devices include wireless electronic devices, wired electronic devices, mobile electronic devices (e.g., electronic devices that can operate based on battery power), and non-mobile electronic devices (e.g., electronic devices that operate based on wall power), and other types of electronic devices.

Referring now to FIG. 1, a functional block diagram of an example communication system 100 is illustrated in a residential setting. A content distribution system 104 receives content from a plurality of content providers, such as content provider 108. The content distribution system 104 communicates content and other data to users via one or more communication networks, such as a satellite content delivery system 112 and/or the Internet 116.

Regarding satellite content delivery, the content distribution system 104 generates uplink signals 120 and communicates the uplink signals 120 to one or more satellites, such as satellite 124. The satellite content distribution system 104 communicates the uplink signals 120 to the satellite(s) via one or more antennas, such as antenna 126.

The satellite 124 includes one or more receiving antennas, such as receiving antenna 128, and one or more transmitting antennas, such as transmitting antenna 132. The satellite 124 receives the uplink signals 120 via the receiving antenna(s). The satellite 124 generates downlink signals 136 based on the uplink signals 120 and transmits the downlink signals 136 via the transmitting antenna(s). The satellite 124 transmits the downlink signals 136 to a plurality of residential user devices, such as residential user device 140. For example, the satellite 124 may transmit the downlink signals 136 over a geographical area for reception by residential user devices located within that geographical area.

The residential user device 140 may include, for example, a set-top box, a digital video recorder (DVR), a network gateway, or a combination set-top box/DVR/network gateway, or another suitable type of residential user device. The residential user device 140 may be used in a fixed setting, such as in a dwelling. Additionally or alternatively, the residential user device 140 may be used in a mobile setting, such as in a vehicle (e.g., plain, train, automobile, etc.).

The residential user device 140 receives the downlink signals 136 via an antenna 144. The antenna 144 may be fixed in a single direction (e.g., when used in a fixed setting) or may be a tracking antenna in various implementations (e.g., when used in a mobile setting). One or more cables for communicating audio/visual (A/V) signals may be connected between the antenna 144 and the residential user device 140.

The residential user device 140 may also receive A/V data via the Internet 116, such as from the content distribution system 104 and/or one or more other data sources that can be accessed via the Internet 116. The residential user device 140 may communicate via the Internet 116 via one or more networking devices, such as a modem 148 (e.g., a cable modem) and/or a telephone (not shown). Some types of residential user devices may include a modem (e.g., a cable modem). The residential user device 140 may also receive A/V signals via one or more radio frequency (RF) antennas (not shown), for example, to receive local content transmitted over local airwaves.

The residential user device 140 generates A/V signals based on received signals and transmits A/V signals to one or more output devices, such as a display 152. In various implementations, the residential user device 140 may be implemented within a display. The residential user device 140 may store A/V data in a computer-readable medium (e.g., within the residential user device 140), for example, for transmission at a later time as commanded by a user.

The residential user device 140 may also wirelessly communicate with one or more other devices, such as device 156. For example, the residential user device 140 may communicate wirelessly using an IEEE 802.11 wireless communication standard, a Bluetooth communication standard, a Zigbee communication standard, and/or one or more other suitable wireless communication standards. Communication standards may also be referred to as communication protocols.

Figure 2:
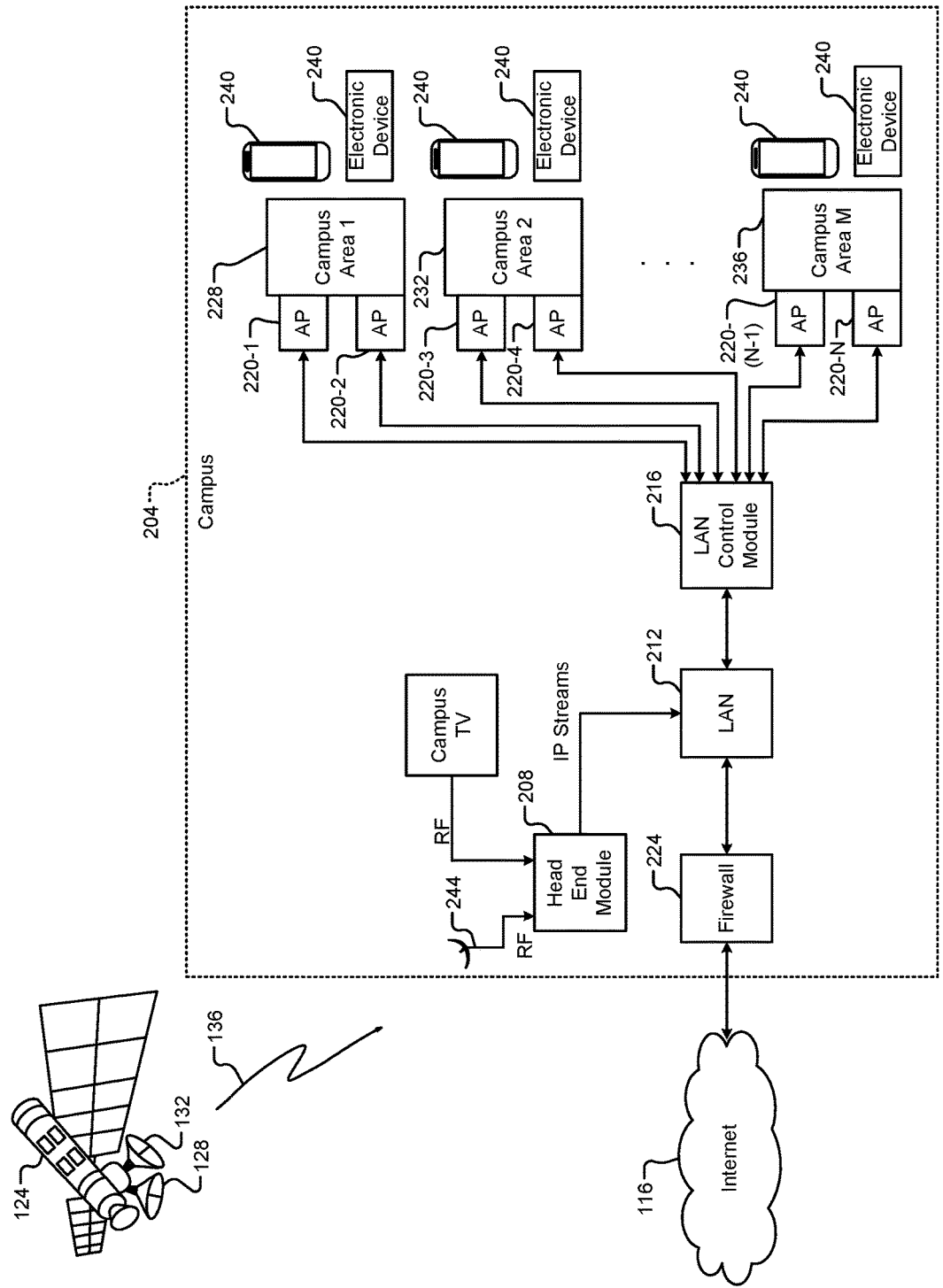

FIG. 2 is a functional block diagram including a portion of the satellite content delivery system 112 in a campus setting. The campus setting is different than the residential setting of FIG. 1. The satellite 124 transmits the downlink signals 136 to a campus 204. The campus may be, for example, a business campus, a university campus, a hotel campus, a multi-family residential unit campus, a hospital campus, or another suitable type of campus visited by a large number of people. While the present disclosure is discussed in terms of a campus, the present application is also applicable to vehicles that carry a large number of people, such as trains, airplanes, marine vessels (e.g., cruise ships), etc.

The campus 204 includes a head end module 208, a local area network (LAN) 212, one or more LAN (LAN) modules, such as LAN control module 216, and one or more access points (APs). Example APs include APs 220-1, 220-2, 220-3, 220-4, . . . , 220-(N−1), and 220-N (collectively (APs 220)). The campus 204 may also include a firewall 224 implemented between the Internet 116 and the LAN 212. The LAN control module(s) control communication to and from the APs 220.

The APs 220 enable electronic devices to wirelessly communicate with the LAN 212 and the Internet 116. Wired electronic devices may also communicate with the LAN 212 and the Internet 116 and may connect to the APs 220 by wire.

The APs 220 may be positioned throughout the campus 204 to enable wireless and wired connections at various locations throughout the campus 204. For example, one or more APs may be implemented to enable wireless and wired connection of electronic devices in and around a first campus area 228, one or more APs may be implemented to enable wireless and wired connection of electronic devices in and around a second campus area 232, and one or more APs may be implemented to enable wireless and wired connection of electronic devices in and around an M-th campus area 236. The campus areas may include, for example, various types of buildings (e.g., dormitories, libraries, cafeterias, etc.), portions of buildings, open areas, etc.

Electronic devices include wired electronic devices and wireless electronic devices, mobile electronic devices and fixed electronic devices. Wireless electronic devices can communicate wirelessly, for example using an IEEE 802.11 wireless communication standard, a Bluetooth communication standard, a Zigbee communication standard, and/or one or more other suitable wireless communication standards. Communication standards may also be referred to as communication protocols. Wired electronic devices can communicate by wire. Some electronic devices can communicate wirelessly and by wire. Fixed electronic devices operate using power received from a wall outlet. Mobile electronic devices operate based on power from a battery, although some mobile devices can also operate based on power received from a wall outlet. Examples of electronic devices include, but are not limited to, cellular phones, tablet devices, portable personal computers, personal media devices, smart televisions, gaming consoles, and personal wearable devices. Examples of electronic devices are illustrated by 240 in FIG. 2.

One or more antennas, such as antenna 244, receive the downlink signals 136. The antennas provide radio frequency (RF) signals to the head end module 208 based on the downlink signals 136. The RF signals include content transmitted by the content distribution system 104 via the satellite system. The RF signals include various content streams on different frequency "channels" of the RF signals.

As discussed in more detail below, the head end module 208 tunes to the respective channels and serves streaming content for the respective channels over the campus intranet using IP transmission. In various implementations, in addition to the satellite content, the head end module 208 may also serve streaming content for one or more local channels, such as a campus television channel, using IP transmission. Electronic devices connected to the APs can tune to and stream content on the channels by accessing IP addresses associated with the channels, respectively.

Figure 3:
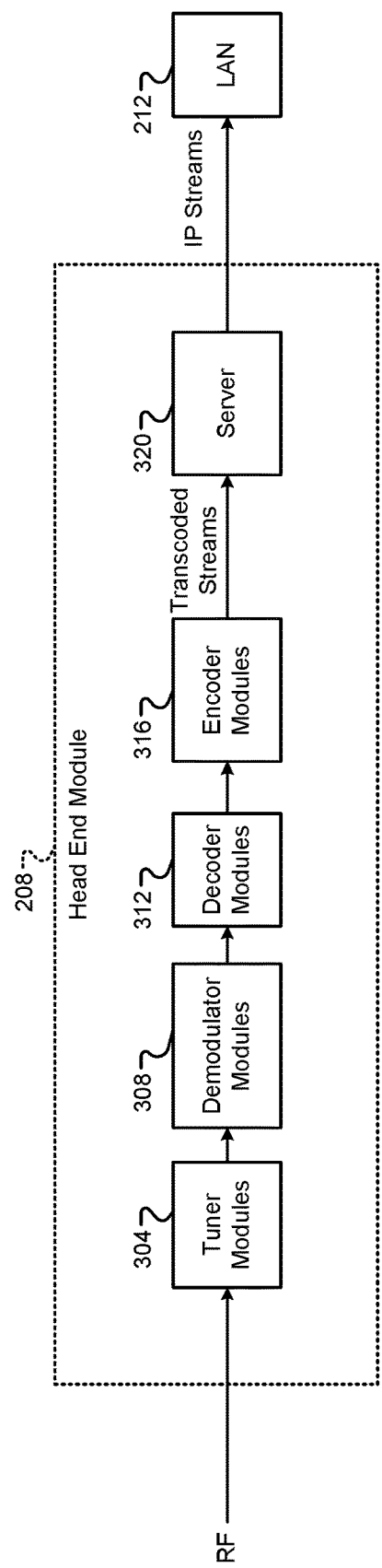
FIG. 3 is a functional block diagram of an example implementation of a head end module that streams content received via satellite using Internet Protocol (IP) transmission.

FIG. 3 is a functional block diagram of an example implementation of the head end module 208. The head end module 208 may include a plurality of tuner modules 304, a plurality of demodulator modules 308, and a plurality of decoder modules 312. The tuner modules 304 receive the RF signals, such as the RF signals generated based on the downlink signals 136, RF signals for local over-air content (e.g., one or more local channels), and/or one or more RF signals generated on campus.

The tuner modules 304 tune to available channels to generate tuned signals corresponding to the channels, respectively. The demodulator modules 308 demodulate the tuned signals to form demodulated signals. The decoder modules 312 decode the demodulated signals to form decoded signals. By providing multiple tuners, demodulators, and decoders, different content streams for each different channel can be derived. In various implementations, one tuner module, demodulator module, and decoder module may be provided for each available channel. In various implementations, one or more tuner modules, one or more demodulator modules, and/or one or more decoder modules may be shared.

The head end module 208 also includes one or more encoder modules 316 and a server 320. The encoder modules 316 encode the decoded signals to form transcoded signals. While the decoder and encoder modules are illustrated as separate modules, one or more transcoder modules may be implemented to perform the decoding and encoding functions of the decoder and encoder modules 312 and 316. The transcoded signals provide streams of content on the available channels. In various implementations, the transcoded signals may be MPEG-2 transport streams or another suitable type of transcoding, as discussed further below.

In one implementation, the server 320 may include an IP encapsulator module that packetizes the transcoded signals according to Internet Protocol and transmits each packetized stream (corresponding to each available channel) to a respective multicast IP address. Electronic devices can then stream content from a particular channel by joining that channel's multicast IP address.

An electronic device transmits a join request to the server 320 to join a multicast IP address. An electronic device transmits a leave request to the server 320 when the electronic device stops streaming content from a multicast IP address. The server 320 may authenticate rights of electronic devices to receive content before allowing access to content. Each electronic device may execute an application to join in the authentication, transmit join requests, transmit leave requests, and display received content on one or more displays that are connected to, or part of, the electronic device.

In various implementations, the encoder modules 316 may generate the transcoded signals such that the transcoded signals have a lower bit-rate (and/or spatial resolution) than the received signals. This may enable more devices to stream content from a particular channel. However, the quality of the content may be lesser for each electronic device receiving the content.

As such, the encoder modules 316 may generate the transcoded signals as scalable video coding (SVC) bit streams. SVC involves encoding a video signal into multiple layers including a base layer signal and multiple enhancement layer signals. The base layer signal has a resolution that is lower than the original video signal. Each of the enhancement layer signals add to the resolution of the base layer signal. For example only, the encoder modules 316 may generate transcoded signals according to the Scalable Video Coding (SVC) protocol described in Annex G of the ITU-T Recommendation H.264|ISO/IEC 14496-10 specification. Enhancement layers may increase spatial resolution, temporal resolution (frame rate), visual quality, or a combination of two or more thereof.

In the example of the transcoded signals including scalable video bit streams, the transcoders output one base layer signal and one or more enhancement layer signals for the content stream of each channel. The server 320 packetizes the signals and transmits the packetized base layer signal and the packetized enhancement layer signal(s) via respective multicast IP addresses. For example, in the example of 1 base layer signal and 4 enhancement layer signals, the server 320 transmits the packetized base layer signal and the packetized enhancement layer signals via 5 different multicast IP addresses.

An electronic device requesting content of a channel may initially join the multicast IP address of the base layer signal of that channel. The electronic device may determine whether to join the multicast addresses of one or more enhancement layer signals. For example, the electronic device may monitor a data transfer rate of the currently joined multicast addresses of the channel and join a multicast address of a next higher enhancement layer signal when the data transfer rate is greater than a predetermined rate associated with the next higher enhancement layer signal. Conversely, the electronic device may leave a multicast address of a next lower enhancement layer signal when the data transfer rate of the currently joined multicast addresses of the channel is less than a predetermined rate associated with the highest currently joined enhancement layer signal. In this way, an electronic device may receive higher resolution as the number of electronic devices streaming content of a channel decreases, and vice versa. The electronic device constructs the base layer signal and one or more enhancement layer signals being received and outputs signals for display accordingly.

Figure 4:
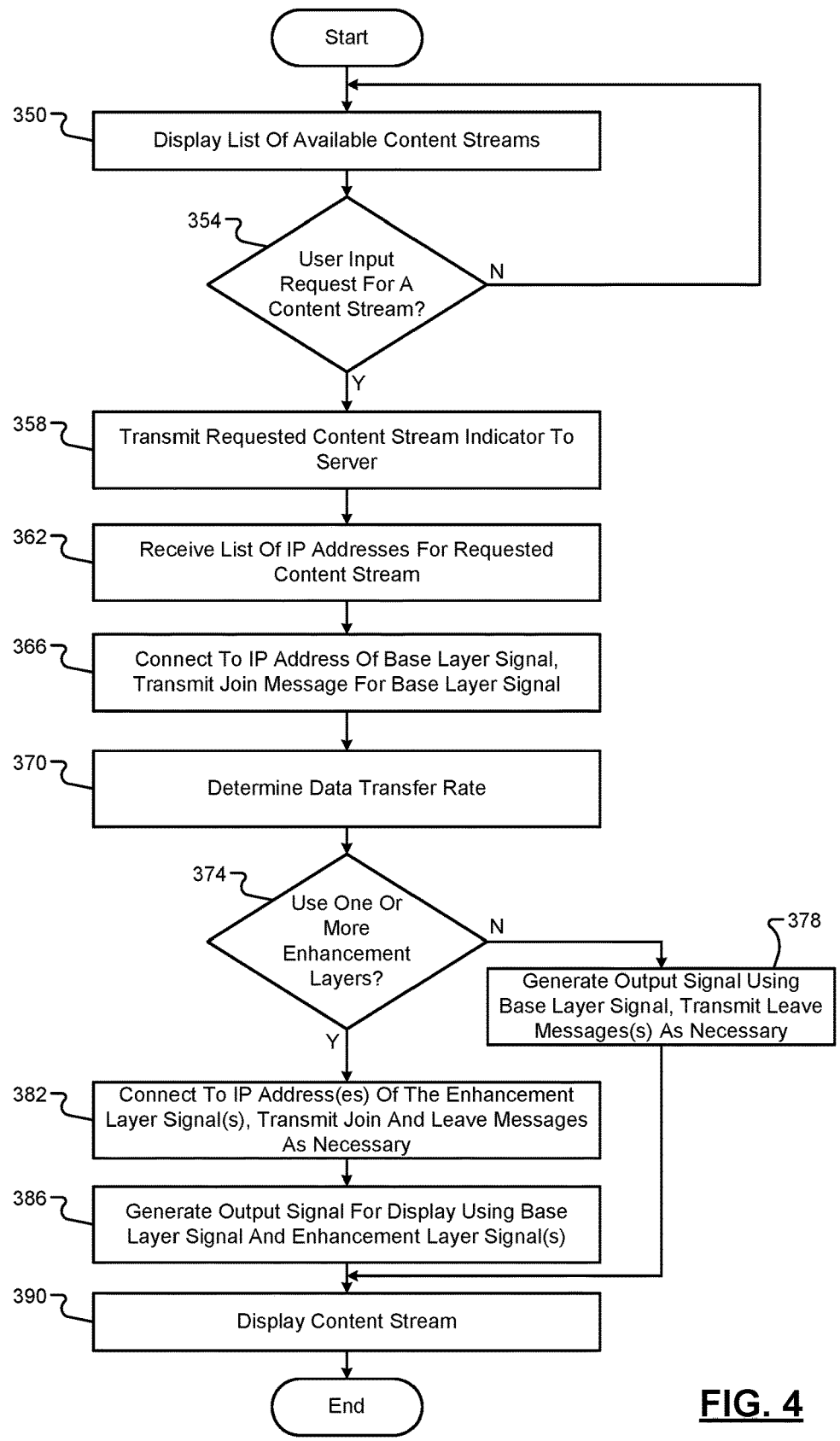
FIG. 4 is a flowchart depicting an example method of streaming content to an electronic device using scalable video coding (SVC).

FIG. 4 includes a flowchart depicting an example method of displaying a content stream by an electronic device. Control may begin once the electronic device has authenticated itself with the head end module 208, and more particularly the server 320. At 350, the electronic device receives a list of available content streams from the server 320. The electronic device displays the list of available content streams on a display associated with the electronic device.

At 354, the electronic device determines whether a user has input a request to view one of the available content streams. If 354 is true, control continues with 358. If 354 is false, control may remain at 350. The user may input a request to view one of the available content streams, for example, by selecting that content stream via the display. If a content stream is currently being streamed by the electronic device, the electronic device may transmit a leave message to the server 320 for one or more instances of that content stream that the electronic device was connected to for viewing.

At 358, the electronic device transmits a message to the server 320 indicative of the content stream requested by the user. The server 320 identifies the IP addresses for the base layer signal and the enhancement layer signal(s) of the requested content stream and transmits a list of the IP addresses to the electronic device. The electronic device receives the list of IP addresses for the requested content stream at 362.

At 366, the electronic device connects to the IP address of the base layer signal of the requested content stream and transmits a join message for that IP address to the server 320. At 370, the electronic device determines a data transfer rate between the server 320 and the electronic device for the requested content stream.

The electronic device may determine whether to use one or more of the enhancement layer signals for the requested content stream at 374. For example, the electronic device may use an enhancement layer signal, along with the base layer signal, when the data transfer rate is greater than a predetermined value for that enhancement layer signal. Each enhancement layer signal may have a respective predetermined value. If 374 is false, the electronic device may generate the output signal for display based on the base layer signal at 378, and control may continue with 390. If 374 is true, control may continue with 382.

At 382, the electronic device connects to the one or more IP addresses of the one or more enhancement layer signals, respectively, to be used to enhance the base layer signal of the requested content stream. The electronic device may also transmit join and leave messages for the respective enhancement layer signals as necessary when adding (joining) the IP address of an enhancement layer signal or discontinuing (leaving) the IP address of an enhancement layer signal. At 386, the electronic device generates the output signal for display based on the base layer signal and the one or more enhancement layer signals to be used. At 390, the electronic device displays the output signal for the requested content stream on the display. While the example of FIG. 4 is shown as ending, control may perform 370-390 every predetermined period to allow the number of enhancement layer signals to be increased and decreased as the data transfer rate increases and decreases, respectively.

In various implementations, the encoder modules 316 may generate the transcoded signals according to a Hyper Text Transfer Protocol (HTTP) Adaptive Streaming communication protocol. Example HTTP Adaptive Streaming communication protocols include, but are not limited to, Microsoft Smooth Streaming, Apple HTTP Live Stream (HLS), and MPEG Dynamic Adaptive Streaming over HTTP (DASH). When generating the transcoded signals according to a HTTP Adaptive Streaming communication protocol, the encoder modules 316 encode each channel's content stream into multiple different versions having different bit rates and resolutions. For example, the encode modules 316 may encode a channel's content stream into five to seven different bit rates and resolutions, although greater and lesser numbers are possible.

In this implementation, the server 320 segments each of the different versions into chunks. The chunks may be, for example, approximately 4-10 seconds in length, although shorter and longer chunks are possible. Each electronic device streams the content via unicast transmissions (i.e., downloads in the form of HTTP transactions) of the chunks. An electronic device may determine, request, and download chunks of a specific version, for example, based on the data transfer rate. An electronic device may, for example, download chunks having a higher bit rate and resolution as the data transfer rate increases, and vice versa. Use of HTTP adaptive streaming may be useful where the number of concurrent electronic devices is relatively small and the number of available channels is relatively large. Use of SVC may be useful where the number of concurrent electronic devices may be relatively large and the number of available channels is relatively small.

Figure 5:
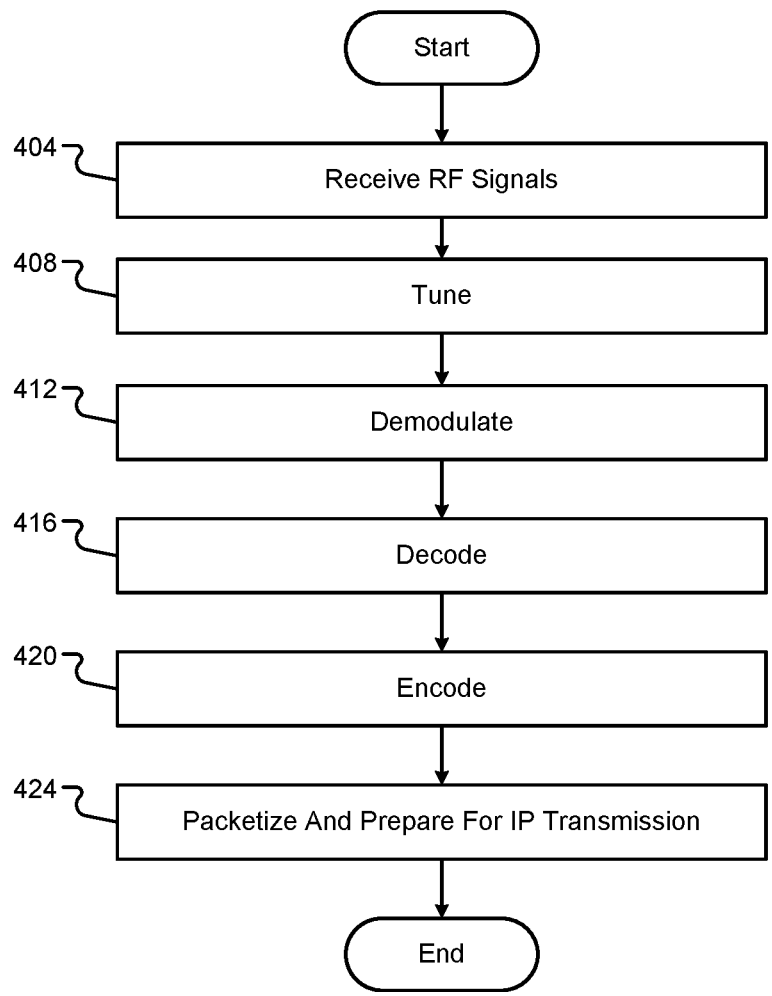
FIG. 5 is a flowchart depicting an example method of processing content streams at a head end module for IP transmission.

FIG. 5 includes a flowchart depicting an example method of transmitting content streams received via satellite using IP transmission according to the examples of FIGS. 2, 3, and 4. At 404, the tuner modules 304 receive the RF signals transmitted via satellite. The RF signals may also include RF signals received over the air from local broadcasters and RF signals generated on site, such as at the campus 204. The tuner modules 304 tune to and generate tuned signals corresponding to content streams for each channel at 408.

At 412, the demodulator modules 308 demodulate the tuned signals to form demodulated signals. At 416, the decoder modules 312 decode the demodulated signals to produce decoded signals. At 420, the encoder modules 316 encode the decoded signals to produce the transcoded signals. For example, the encoder modules 316 may encode the decoded signals using SVC or into one or more lower bit rate signals, for example, for HTTP adaptive streaming. The server 320 packetizes the transcoded signals for IP transmission at 424, and electronic devices at the campus 204 can stream content from the server 320 upon request using IP transmission.

Figure 6:
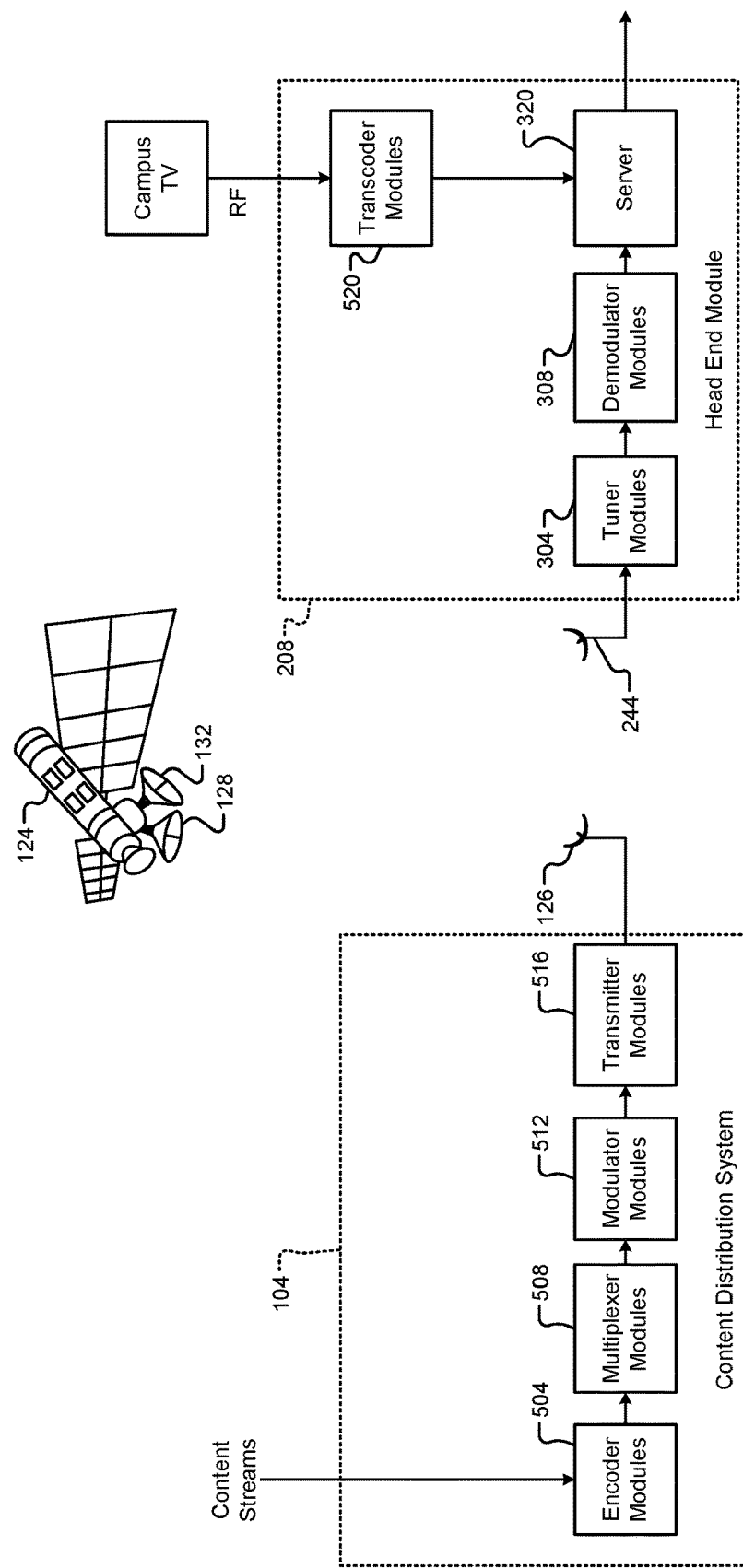
FIG. 6 is a functional block diagram of an example implementation of a content distribution system and a head end module.

FIG. 6 includes a functional block diagram including example implementations of the content distribution system 104 and the head end module 208. In FIG. 6, the encoding is performed at the content distribution system 104 and encoded transmissions are transmitted to the campus 204 via satellite.

The content distribution system 104 may include one or more encoder modules 404 that encode the content streams to form encoded signals having lower bit rates and resolutions than the original content streams. In an example, encoder modules 504 may encode the content streams using SVC into a base layer signal and one or more enhancement layer signals. One or more multiplexer modules 508 multiplex the encoded streams, and one or more modulator modules 512 modulate the multiplexer output signals in preparation for satellite transmission. One or more transmitter modules 516 transmit the modulated signals to the campus 204 via the satellite content distribution system 112.

Performing encoding at the content distribution system 104 reduces the cost of the head end module 208 at the campus 204 since the head end module 208 would not need to perform the encoding/transcoding for the content received via satellite. One or more transcoder modules 520 may be implemented, for example, to transcode RF signals, for example, received over the air at the campus 204 from local broadcasters and/or generated at the campus 204. In various implementations, the transcoder modules 520 may perform the same type of encoding as the encoder modules 504. The server 320 will then transmit the transcoded signals from the transcoder modules 520 and the demodulated signals from the demodulator modules 308, for example, using multicast or unicast IP transmission, as described above.

Figure 7:
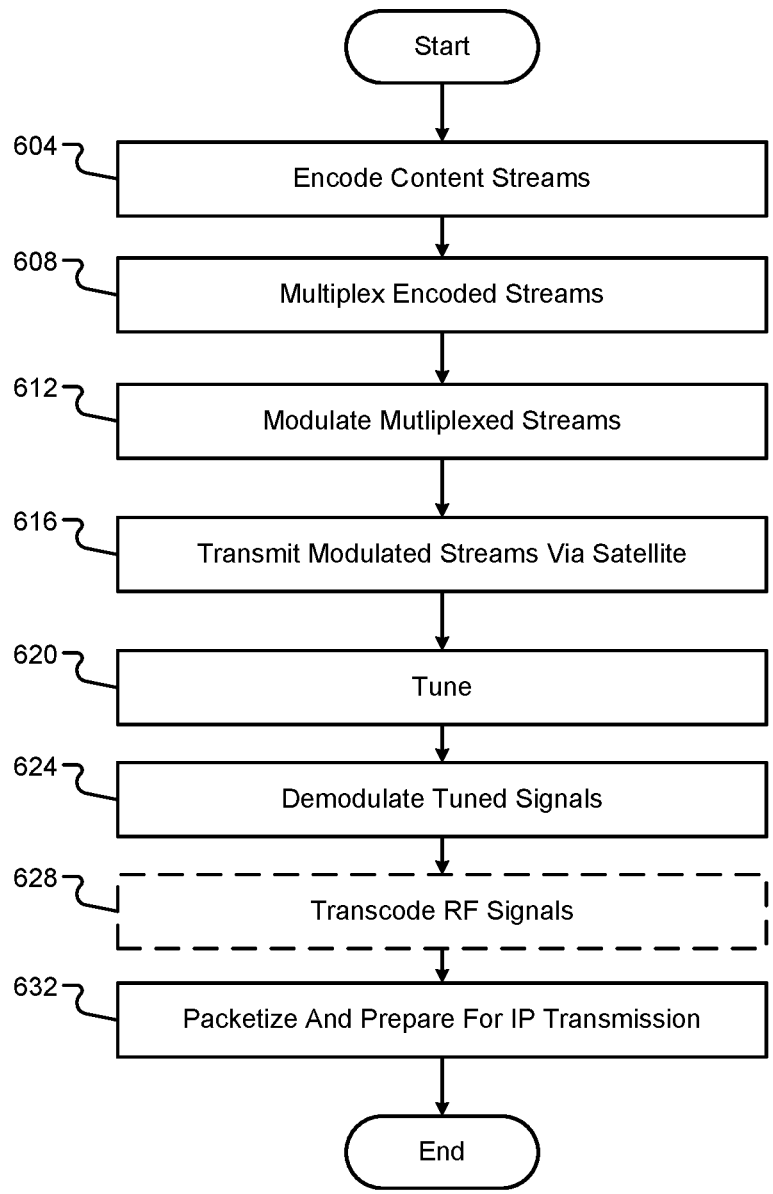
FIG. 7 is a flowchart depicting an example method of processing content streams for IP transmission.

FIG. 7 includes a flowchart depicting an example method of transmitting content streams, for example, as in the example of FIG. 6. Control begins with 604 where the encoder module(s) 504 encode the content streams to produce the encoded streams. For example, the encoder module(s) 504 may encode the content streams using SVC or into one or more lower bit rate signals, for example, for HTTP adaptive streaming. The multiplexer module(s) 508 multiplex the encoded streams at 608, and one or more modulator module(s) 512 modulate the multiplexer output signals at 612 in preparation for satellite transmission. The modulated streams are transmitted by satellite at 616.

At 620, the tuner modules 304 tune to and generate tuned signals corresponding to content streams for each channel. At 624, the demodulator modules 308 demodulate the tuned signals to form demodulated signals. Optionally, at 628, the transcoder module(s) 520 transcode RF signals received over the air from local broadcasters and/or RF signals generated on site, such as at the campus 204. The transcoder module(s) 520 may, for example, transcode the RF signals using SVC or into one or more lower bit rate signals, for example, for HTTP adaptive streaming.

At 632, the server 320 packetizes the transcoded signals and the demodulated signals for IP transmission. Electronic devices at the campus 204 can stream content from the server 320 upon request using IP transmission.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, such as "connected," "engaged," "coupled," "adjacent," "next to," "on top of" "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" may be replaced with the term "circuit." The term "module" may refer to, be part of, or include: an Application Specific Integrated Circuit (ASIC); a digital signal processor (DSP) circuit, a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

A module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of streaming content to electronic devices, the method comprising:
   receiving, using one or more antennas, radio frequency (RF) signals including content broadcast via satellite;
   using a plurality of tuner modules, tuning to predetermined channels of the RF signals to produce a plurality of tuned signals from the RF signals, each of the tuned signals corresponding to content of one of the predetermined channels;
   demodulating the tuned signals to form demodulated signals, respectively;
   decoding the demodulated signals to form decoded signals, respectively;
   encoding the decoded signals to produce sets of transcoded signals for each of the predetermined channels, respectively, each of the sets of transcoded signals including (i) at least one signal having a first bit rate that is less than a second bit rate of the one of the tuned signals of the respective one of the predetermined channels having first content and (ii) at least one other signal corresponding to the first content for displaying the first content of the respective one of the channels;
   using a server, packetizing the sets of transcoded signals for the predetermined channels according to Internet Protocol (IP) to produce packetized signals, respectively; and
   transmitting, using the server, a computer network, and a plurality of access points, selected ones of the packetized signals to electronic devices using multicast Internet Protocol.

2. The method of claim 1 wherein each of the sets of transcoded signals includes a plurality of signals having respective bit rates that are each less than the second bit rate of the one of the tuned signals of the respective one of the predetermined channels.

3. The method of claim 1 wherein encoding the decoded signals to produce sets of transcoded signals for the predetermined channels, respectively, includes encoding the decoded signals according to a Hyper Text Transfer Protocol (HTTP) Adaptive Streaming communication protocol.

4. The method of claim 3 wherein encoding the decoded signals to produce sets of transcoded signals for the predetermined channels, respectively, includes encoding the decoded signals according to a Microsoft Smooth Streaming protocol, an Apple HTTP Live Stream (HLS) protocol, or a Moving Picture Experts Group (MPEG) Dynamic Adaptive Streaming over HTTP (DASH) protocol.

5. The method of claim 1 wherein encoding the decoded signals to produce sets of transcoded signals for the predetermined channels, respectively, includes encoding the decoded signals according to a Scalable Video Coding (SVC) protocol.

6. The method of claim 5 wherein each of the sets of transcoded signals includes a base layer signal having the first bit rate that is less than the second bit rate of the one of the tuned signals of the respective one of the predetermined channels and at least one enhancement layer signal, and
   wherein transmitting selected ones of the packetized signals includes transmitting ones of the packetized signals corresponding to the base layer signal and ones of the packetized signals corresponding to the at least one enhancement layer signal using respective multicast IP addresses.

7. The method of claim 1 further comprising:
receiving at least one of the packetized signals of a predetermined channel at an electronic device via at least one of the plurality of access points; and
displaying the content of the predetermined channel on a display of the electronic device based on the at least one of the packetized signals.

8. A head end module for streaming content, comprising:
a plurality of tuner modules receiving, from one or more satellite receiver antennas, radio frequency (RF) signals including content broadcast via satellite, said plurality of tuner modules providing a plurality of tuned signals from predetermined channels of the RF signals, each of the tuned signals corresponding to content of one of the predetermined channels;
at least one demodulator module receiving the tuned signals and providing demodulated signals, respectively;
at least one decoder module receiving the demodulated signals and providing decoded signals, respectively;
at least one encoder module receiving the decoded signals and providing sets of transcoded signals for each of the predetermined channels, respectively, each of the sets of transcoded signals including (i) at least one signal having a first bit rate that is less than a second bit rate of the one of the tuned signals of the respective one of the predetermined channels having first content and (ii) at least one other signal corresponding to the first content for displaying the content of the respective one of the predetermined channels; and
a server receiving the transcoded signals and transmitting respective packetized signals to one or more access points according to a multicast Internet Protocol (IP).

9. The head end module of claim 8 wherein each of the sets of transcoded signals includes a plurality of signals having respective bit rates that are each less than the second bit rate of the one of the tuned signals of the respective one of the predetermined channels.

10. The head end module of claim 8 wherein the at least one encoder module encodes the decoded signals according to a Hyper Text Transfer Protocol (HTTP) Adaptive Streaming communication protocol.

11. The head end module of claim 10 wherein the at least one encoder module encodes the decoded signals according to a Microsoft Smooth Streaming protocol, an Apple Hyper Text Transfer Protocol (HTTP) Live Stream (HLS) protocol, or a Moving Picture Experts Group (MPEG) Dynamic Adaptive Streaming over HTTP (DASH) protocol.

12. The head end module of claim 8 wherein the at least one encoder module encodes the decoded signals according to a Scalable Video Coding (SVC) protocol.

13. The head end module of claim 12 wherein each of the sets of transcoded signals includes a base layer signal having the first bit rate that is less than the second bit rate of the one of the tuned signals of the respective one of the predetermined channels and at least one enhancement layer signal, and
wherein the server transmits ones of the packetized signals corresponding to the base layer signal and ones of the packetized signals corresponding to the at least one enhancement layer signal using respective multicast IP addresses.

14. A system comprising:
the head end module of claim 8;
at least one of the access points; and
an electronic device that receives at least one of the packetized signals of a predetermined channel via the at least one of the access points and that displays the content of the predetermined channel on a display of the electronic device based on the at least one of the packetized signals.

15. A method of streaming content, the method comprising:
receiving, at a content distribution system, content signals corresponding to respective content streams;
at the content distribution system, encoding the content signals to produce sets of encoded signals for each of the predetermined channels, respectively, each of the sets of encoded signals including at least (i) one signal having a first bit rate that is less than a second bit rate of the one of the respective content signals having first content and (ii) at least one other signal corresponding to the first content for displaying the first content of the one of the respective content signals;
transmitting, via satellite, the sets of encoded signals to a head end module;
using a server at the head end module, multicasting the encoded signals, using respective Internet Protocol (IP) multicast addresses, to a plurality of access points.

16. The method of claim 15 wherein each of the sets of encoded signals includes a plurality of signals having respective bit rates that are each less than the second bit rate of the one of the respective content signals.

17. The method of claim 15 wherein encoding the content signals to produce sets of encoded signals for predetermined channels, respectively, includes encoding the content signals according to a Hyper Text Transfer Protocol (HTTP) Adaptive Streaming communication protocol.

18. The method of claim 17 wherein encoding the content signals to produce sets of encoded signals for predetermined channels, respectively, includes encoding the content signals according to a Microsoft Smooth Streaming protocol, an Apple Hyper Text Transfer Protocol (HTTP) Live Stream (HLS) protocol, or a Moving Picture Experts Group (MPEG) Dynamic Adaptive Streaming over HTTP (DASH) protocol.

19. The method of claim 15 wherein encoding the content signals to produce sets of encoded signals for predetermined channels, respectively, includes encoding the content signals according to a Scalable Video Coding (SVC) protocol.

20. The method of claim 19 wherein each of the sets of encoded signals includes a base layer signal having the first bit rate that is less than the second bit rate of the one of the respective content signals and at least one enhancement layer signal, and
wherein multicasting the encoded signals includes transmitting ones of the packetized signals corresponding to the base layer signal and ones of the at least one enhancement layer signal using respective multicast IP addresses.

* * * * *